July 21, 1964 W. ZÜHLSDORF 3,141,963

CIRCUITS AND CONTROL FOR MANTISSA DEVICES IN BINARY COMPUTING MACHINES

Filed July 6, 1959 10 Sheets-Sheet 1

INVENTOR.
WERNER ZÜHLSDORF

INVENTOR.
WERNER ZÜHLSDORF

July 21, 1964 W. ZÜHLSDORF 3,141,963

CIRCUITS AND CONTROL FOR MANTISSA DEVICES IN BINARY COMPUTING MACHINES

Filed July 6, 1959 10 Sheets-Sheet 3

INVENTOR.
WERNER ZÜHLSDORF

July 21, 1964 W. ZÜHLSDORF 3,141,963

CIRCUITS AND CONTROL FOR MANTISSA DEVICES IN BINARY COMPUTING MACHINES

Filed July 6, 1959 10 Sheets-Sheet 4

INVENTOR.
WERNER ZÜHLSDORF

July 21, 1964 W. ZÜHLSDORF 3,141,963

CIRCUITS AND CONTROL FOR MANTISSA DEVICES IN BINARY COMPUTING MACHINES

Filed July 6, 1959 10 Sheets-Sheet 6

INVENTOR.
WERNER ZÜHLSDORF

July 21, 1964 W. ZÜHLSDORF 3,141,963

CIRCUITS AND CONTROL FOR MANTISSA DEVICES IN BINARY COMPUTING MACHINES

Filed July 6, 1959 10 Sheets-Sheet 7

INVENTOR.
WERNER ZÜHLSDORF

INVENTOR.
WERNER ZÜHLSDORF

July 21, 1964 W. ZÜHLSDORF 3,141,963

CIRCUITS AND CONTROL FOR MANTISSA DEVICES IN BINARY COMPUTING MACHINES

Filed July 6, 1959 10 Sheets-Sheet 9

INVENTOR.
WERNER ZÜHLSDORF

July 21, 1964 W. ZÜHLSDORF 3,141,963

CIRCUITS AND CONTROL FOR MANTISSA DEVICES IN BINARY COMPUTING MACHINES

Filed July 6, 1959 10 Sheets-Sheet 10

United States Patent Office 3,141,963

Patented July 21, 1964

3,141,963

CIRCUITS AND CONTROL FOR MANTISSA DEVICES IN BINARY COMPUTING MACHINES

Werner Zühlsdorf, Berlin, Germany, assignor to VEB Wissenschaftlich-Technisches Buro für Geratebau, Berlin, Germany Filed July 6, 1959, Ser. No. 825,249
1 Claim. (Cl. 235—164)

The invention relates to circuits for mantissa devices and their control in binary computing machines.

Computing machines operating with binary numbers are known, which are equipped with suitable stores, for example magnetic-drum, magnetic-matrix or ferrite-core stores, for the formation of logarithmic mantissas. In the construction of these machines, the mantissa series assigned to a definite binary number series has been fed in, with the allocation of suitable addresses, by means of fixed circuits and corresponding magnetisation of the drums, matrix magnets or ferrite cores. To achieve a sufficiently high degree of accuracy, the storage of a suitable large number of mantissas is necessary. When a binary number is fed into the computer, the address assigned to the binary number is called up under the control of relays, electron tubes or transistors, so-called binary units. In accordance with the switching condition of the binary units and the address formed therefrom by circuit technique, the reading device of the drum store, magnetic-matrix store or ferrite-core store becomes effective when the drum at the scanning head has reached the position assigned to the address or when the scanning system has found the magnet group in the matrix store or the ferrite core group in the ferrite core store assigned to the address. The mantissa, assigned to the initiating binary number, is thereupon interrogated and is stored in further binary units of the number output.

In order not to allow the number of mantissas to be stored, and hence the technical complexity of the store, to become too great, a definite minimum number of mantissas is stored, corresponding to the required accuracy. If a binary number is to be converted into a mantissa not contained in the store, a routing device provided for this purpose controls the two mantissa values in the stores, which lie nearest the number fed in, and then in a further unit for addition and division, initiates an interpolation process, which then as final result stores the required mantissa in the binary units assigned to the number output.

Computing machines are furthermore known, in which the formation of mantissas of the natural logarithm is effected by the use of assemblies equipped with binary units, said assemblies being controlled by a suitable routing device in such a manner that the formation of the mantissa of any desired number is effected by the machine in accordance with the mathematical laws of iteration. For this purpose, assemblies are necessary which, after the binary number to be determined as mantissa has been fed in, controlled by means of a suitable routing device, with the formulation $a_0=1+x^2$ and $b_0=2x$, feeds the values thus determined firstly into an assembly which computes the formula $a_{n+1}=\frac{1}{2}(a_n+b_n)$ and further to an assembly which computes the formula $$b_{n+1}=\sqrt{b_n.a_{n+1}}$$

Another assembly, the comparison unit, compares the values $a_{n+1}$ and $b_{n+1}$ represented by binary units at the otuput of the formula-computing assemblies. As long as there is no equality between the values found for $a_{n+1}$ and $b_{n+1}$, the routing device gives the signal for renewed routing of these values as $a_n$ and $b_n$ to the formula-computing assemblies. As long as there is no equality between the values found for $a_{n+1}$ and $b_{n+1}$, the routing device gives the signal for renewed routing of these values as $a_n$ and $b_n$ to the formula-computing assemblies. If the comparison unit, which operates according to the known subtraction circuits, has established equality, the value $a_{n+1}=b_{n+1}=y$, controlled by the routing device, is fed to a further assembly which solves the formula $ln\ x=(x^2-1)=y$. The binary number, represented at the binary units at the output of this last assembly after the decimal point represents the desired mantissa. The assemblies for solving the formulae for the values $a_{n+1}$, $b_{n+1}$ and $y$ are in their turn built up individually of assemblies for solving multiplication, division, power-raising and root-finding problems, which operate by means of sub-routing devices for routing the intermediate results in accordance with the above-mentioned formulae.

In the aforesaid known computing machines, multiplication, division, power-raising and root-finding problems are solved by addition and subtraction assemblies, according to known connections of binary units, which are controlled by extensive routing devices, so that the desired computation proceeds in the machine either in accordance with the known elementary laws of arithmetic, or, as in the second known process for forming logarithms approximately by the iterative method.

The processes for binary computing machines described in the foregoing have the disadvantage that they require a considerable expenditure on apparatus, especially in the number stores and in the routing devices for carrying out the many individual and partial computing operations in the calculation of a function value. The reliability of operation is reduced by the large number of components.

A further decisive disadvantage is the large number of individual and partial operations for the determination of a function value, for example for calculating the natural logarithm by the iterative method. The large number of individual and partial operations makes it compusory, for attaining a technically feasible computation speed, to employ very rapidly operating binary units, for example electron tubes. When used for continuous 24-hour operation, these electron tubes which in their turn have an uneconomically short life, give rise to high maintenance costs, and furthermore require a high power, due to the large number of tubes. If such computers are used for the control and regulation of automatic industrial installations, the time in which the computation operations are carried out is far less that 10% of the period required for readiness for operation, so that the operating costs of an electronic computer are very high in comparison with the degree of uitlization.

A further disadvantage of the known computing machines is that they can only solve problems of mathematical form, for which routing devices for the corresponding iterative approximation forms must be incorporated. For example, if cube roots have to be calculated, a routing device must be provided for controlling the individual and partial operations according to an iterative approximation formula for solving a cube root. The commonly used process of iterative solution of functions in binary number computers therefore fails completely in the automatic computation of powers and roots having variable exponents or exponents which are not whole numbers.

These requirements occur relatively frequently in commercial computation, for example in the case of empirically determined formulae or in the case of $e$-functions, in which one or more variable exponentials have to be introduced into the computation as measured values of automatically operating processes.

The known processes, which store the mantissas of logarithms as fixed values with assigned addresses and compute intermediate values by interpolation have the disadvantage that the storage device assumes considerable dimensions for attaining any serviceable degree of accuracy. Since each interpolation is associated with a division, the disadvantages hereinbefore mentioned are likewise present, due to the many partial and individual operations for the determination of a mantissa.

According to the invention, these disadvantages are eliminated by the provision of circuits for mantissa devices and their control in binary number computing machines. A binary representation must first be made of the number whose mantissa it is desired to calculate. The "decimal" point of this binary number is then shifted so that the characteristic of the logarithm of the shifted binary number to the base 2 is 0. Throughout the specification, this shifted binary number is referred to as the place-shifted antilogarithm. In the illustrated embodiment of the invention, the shifted number has seven binary positions, $n^{-1}$ to $n^{-7}$, and the desired mantissa also has seven positions $m^{-1}$ to $m^{-7}$. A plurality of logical switching circuits are employed, each one corresponding to the seven digit positions of the mantissa. Each of these circuits is adapted to gate an input signal to a single output terminal depending upon the on-off state of a plurality of control inputs which correspond to the binary representation of the place-shifted antilogarithms. The combination of the parallel outputs of the seven logical circuits will then provide a representation of the seven respective binary digits of the desired mantissa.

The invention is explained in constructional examples in the drawings, wherein:

FIGS. 1A and 1B show circuits which are explanatory of the principles of the invention.

Figure 1:
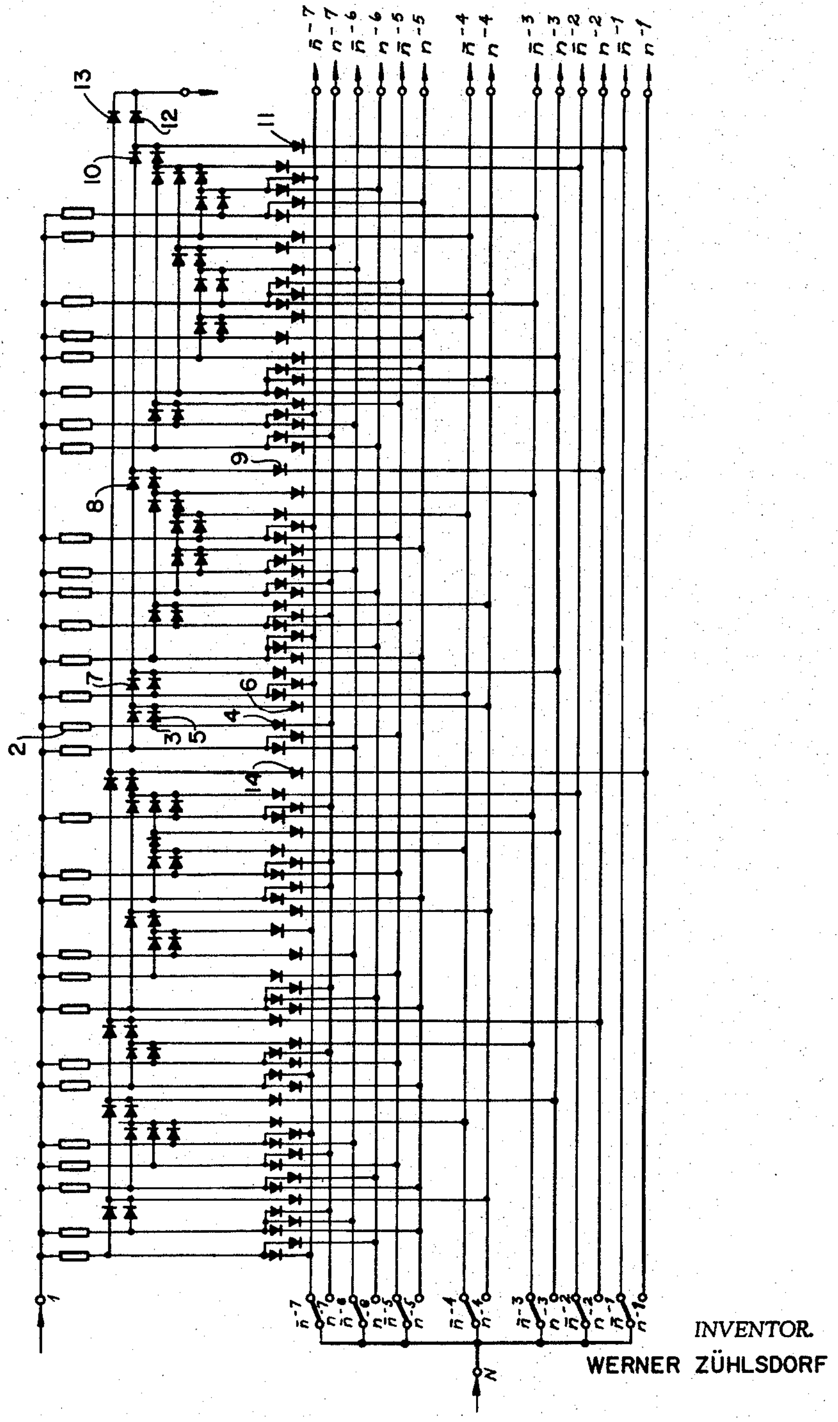
FIGS. 1–7 show constructed circuits for a mantissa device for converting the place-shifted antilogarithm of a binary computed value into the corresponding mantissa of the logarithm to the base 2.

The invention may be more clearly understood with reference to the logarithm table illustrating below. The right-hand column labeled "Decimal antilogarithm" refers to the number whose mantissa it is desired to calculate. Each of the numbers in a given line of this column has a binary value whose place-shifted antilogarithm is the same. Thus, the binary number corresponding to each of the decimal numbers in a given line is determined, and the decimal point of this binary number shifted so that the characteristic of the logarithm of the shifted number (the place-shifted antilogarithm) will be zero. For example, referring to the top line, the binary representation of ¾ is 0.LL: of 3⁄2, 0L.L of three, LL.0; of 6, LL0.0, etc. In each case the decimal point of the binary number is shifted so that the value of the shifted number is between 1 and 2 (i.e., the characteristic of the logarithm to the base 2 is 0). This, of course, is unnecessary in the case of 3⁄2 whose characteristic already is 0. The extent to which the table is carried out depends upon the number of digit positions in the place-shifted antilogarithm. From the above, the manner in which the shifted antilogarithm listed in the left-hand column is derived from the decimal antilogarithm of the right-hand column should be clear. The binary representations of the mantissas of the logarithms to the base 2 of the shifted antilogarithms are listed in the center column of the table. In each case, the characteristic of the logarithm is 0, while the mantissa to the calculated is carried out to seven places, $m^{-1}, m^{-2}, \ldots m^{-7}$. The mantissas may be determined from conventional tables.

| Place-shifted Antilogarithm | | | | | | | Mantissa of the Logarithm | | | | | | | Decimal Antilogarithm |
|---|---|---|---|---|---|---|---|---|---|---|---|---|---|---|
| $n^{-1}$ | $n^{-2}$ | $n^{-3}$ | $n^{-4}$ | $n^{-5}$ | $n^{-6}$ | $n^{-7}$ | $m^{-1}$ | $m^{-2}$ | $m^{-3}$ | $m^{-4}$ | $m^{-5}$ | $m^{-6}$ | $m^{-7}$ | |
| L, L | 0 | 0 | 0 | 0 | 0 | 0 | 0, L | 0 | 0 | L | 0 | L | L | $\ldots \frac{3}{4}; \frac{3}{2}$; 3; 6; 12; 24; . . . 192 . . . |
| L, L | 0 | 0 | 0 | 0 | 0 | L | 0, L | 0 | 0 | L | L | 0 | 0 | $\ldots \frac{193}{4}; \frac{193}{2}$; 193; 386 . . . |
| L, L | 0 | 0 | 0 | 0 | L | 0 | 0, L | 0 | 0 | L | L | 0 | L | $\ldots \frac{97}{4}; \frac{97}{2}$; 97; 194 . . . |
| L, L | 0 | 0 | 0 | 0 | L | L | 0, L | 0 | 0 | L | L | L | 0 | $\ldots \frac{195}{4}; \frac{195}{2}$; 195; 390 . . . |

In accordance with known principles of Boolean algebra, the digit position of the mantissa may be correlated with the digit positions of the place-shifted antilogarithm. The computations for five of the positions of the mantissa are given below under the heading "Circuit Computation for the Mantissa Formation." These, in effect, are the binary equations corresponding to the circuits illustrated in FIGURES 1 to 7.

*Circuit Computation for the Mantissa Formation*

$$F_{M^{-7}} = n^{-1}\bar{n}^{-2}\bar{n}^{-3}\bar{n}^{-4}\bar{n}^{-5}\bar{n}^{-6}\bar{n}^{-7} + n^{-1}\bar{n}^{-2}\bar{n}^{-3}\bar{n}^{-4}\bar{n}^{-5}\bar{n}^{-6}\bar{n}^{-7}$$
$$= n^{-1}\bar{n}^{-2}\bar{n}^{-3}\bar{n}^{-4}\bar{n}^{-5}\bar{n}^{-7}(\bar{n}^{-6} + n^{-6})$$
$$= n^{-1}\bar{n}^{-2}\bar{n}^{-3}\bar{n}^{-4}\bar{n}^{-5}\bar{n}^{-7})$$

$$F_{M^{-6}} = n^{-1}\bar{n}^{-2}\bar{n}^{-3}\bar{n}^{-4}\bar{n}^{-5}\bar{n}^{-6}\bar{n}^{-7} + n^{-1}\bar{n}^{-2}\bar{n}^{-3}\bar{n}^{-4}\bar{n}^{-5}n^{-6}n^{-7}$$
$$= n^{-1}\bar{n}^{-2}\bar{n}^{-3}\bar{n}^{-4}\bar{n}^{-5}(\bar{n}^{-6}\bar{n}^{-7} + n^{-6}n^{-7}$$

$$F_{M^{-5}} = n^{-1}\bar{n}^{-2}\bar{n}^{-3}\bar{n}^{-4}\bar{n}^{-5}\bar{n}^{-6}n^{-7} + n^{-1}\bar{n}^{-2}\bar{n}^{-3}\bar{n}^{-4}\bar{n}^{-5}n^{-6}\bar{n}^{-7}$$
$$+ n^{-1}\bar{n}^{-2}\bar{n}^{-3}\bar{n}^{-4}\bar{n}^{-5}n^{-6}n^{-7}$$
$$= n^{-1}\bar{n}^{-2}\bar{n}^{-3}\bar{n}^{-4}\bar{n}^{-5}[\bar{n}^{-6}n^{-7} + n^{-6}(\bar{n}^{-7} + n^{-7})]$$
$$= n^{-1}\bar{n}^{-2}\bar{n}^{-3}\bar{n}^{-4}\bar{n}^{-5}(\bar{n}^{-6}n^{-7} + n^{-6})$$
$$= n^{-1}\bar{n}^{-2}\bar{n}^{-3}\bar{n}^{-4}\bar{n}^{-5}(n^{-7} + n^{-6})$$

$$F_{M^{-4}} = n^{-1}\bar{n}^{-2}\bar{n}^{-3}\bar{n}^{-4}\bar{n}^{-5}\bar{n}^{-6}\bar{n}^{-7} + n^{-1}\bar{n}^{-2}\bar{n}^{-3}\bar{n}^{-4}\bar{n}^{-5}\bar{n}^{-6}n^{-7}$$
$$+ n^{-1}\bar{n}^{-2}\bar{n}^{-3}\bar{n}^{-4}\bar{n}^{-5}n^{-6}\bar{n}^{-7} + n^{-1}\bar{n}^{-2}\bar{n}^{-3}\bar{n}^{-4}\bar{n}^{-5}n^{-6}n^{-7}$$
$$= n^{-1}\bar{n}^{-2}\bar{n}^{-3}\bar{n}^{-4}\bar{n}^{-5}$$

For the response functions $F_M^{-3}$ and $F_M^{-2}$ in the section of the table the conditions of response have not been given.

$$F_M^{-1} = F_M^{-4} = n^{-1}\bar{n}^{-2}\bar{n}^{-3}\bar{n}^{-4}\bar{n}^{-5}$$

In setting up the equation for the circuit for computing the mantissa, we proceeded as follows:

For all the mantissa values bearing the value L in the various positions $m^{-1}$ to $m^{-7}$ the corresponding circuit conditions for the place-shifted antilogarithm are put down and computed according to the principles of circuit algebra.

$n^{-x}$ means: Circuit is fed with L (Operating contact closed)

$\bar{n}^{-x}$ means: Circuit is fed with 0 (Rest contact closed)

Products are series arrangements of contacts or contact groups. Sums are parallel arrangements of contacts or contact groups.

The circuit formulas for the entire table have been computed in the same manner as in the example of the sector of the table.

The formula $F_M^{-6}$ developed in the circuit computation is represented by the circuit in accordance with the above explanations.

The circuit of FIG. 1B is a different embodiment of the circuit of FIG. 1A with identical circuit functioning. It is derived by inversion of the FIG. 1A circuit, namely, series arrangement conditions become parallel arrangement conditions and operating contacts become rest contacts and vice versa, whereby all contacts are connected to the common minus pole N and a resistance is provided for each parallel input condition from the plus pole P. The illustrated rectifiers make possible the connection of further resistances, not here shown, into the same contact lines and prevent, by their one-way blocking operation, the occurrence of wrong circuit functioning.

The type of circuit arrangements represented by FIG. 1B has been selected for illustrating the invention. The illustrated circuits result from the combination of all the energizing conditions $M^{-x}$ which are produced by evaluation of all the operating conditions in accordance with the binary logarithmic table. This results in the circuits of FIGS. 1–7.

The switches for controlling the state of the logical circuits are illustrated as $n^{-1}$ to $n^{-7}$ at the left of FIGURE 1. The switches are each double-pole, single-throw switches and adapted to connect one of two control lines to a terminal N having a fixed potential. Since each switch is connected to two control lines ($n$ and $\bar{n}$), a binary L or 0 is represented in accordance with which of the lines is coupled to terminal N. The switches are set in accordance with the place-shifted antilogarithm so that a binary representation thereof is coupled to the control lines to control the state of the logical circuits of FIGURES 1 to 7. The logical circuit of FIGURE 1 has an output $M^{-7}$ on which will be produced the $m^{-7}$ digit of the mantissa depending upon the state of the input switches $n^{-1}$ to $n^{-7}$. Similarly, the circuits of FIGURES 2 to 7 include outputs $M^{-6}$ to $M^{-1}$ producing digits $m^{-6}$ to $m^{-1}$, respectively, so that the output signals in parallel will be representative of the desired mantissa. The mantissa, after it is calculated, may be employed in various ways which are not necessary to an understanding of the invention as above described.

When the sum of mantissas or the difference of mantissas, respectively, is to be converted into the place-shifted antilogarithm, the procedure is analogous to that described above. In this procedure, for all values of the place-shifted antilogarithm bearing the value L, the corresponding circuit conditions of the mantissas are noted in the binary positions $n^{-1}$ to $n^{-7}$ and are computed according to the principles of circuit algebra. From these computations we can establish the detailed circuits represented in FIGS. 8–14 as explained above with reference to circuit examples of FIGS. 1A and 1B.

The function of the circuits will now be explained with reference to the performance of the multiplication problem $$0.75\times 28=0.\mathrm{LL}\times \mathrm{LLL00}$$

Since the invention required that the number to be operated on be coded as described above, it is necessary to keep track of the extent to which the decimal point has been shifted. The characteristic indicates this value, and the sign (+ or −) of the characteristic indicates the direction in which the point has been shifted. The combination of the place-shifted antilogarithm and the characteristic is the semilogarithmic coded form of the original number. The two factors 0.LL and LLL00, after conversion to the semilogarithmic coded form, are fed in accordance to known circuits as Numbers $0.75=0.\mathrm{LL}=\mathrm{L.L}-\mathrm{L}$ and
$28=\mathrm{LLL00}=\mathrm{L.LL}+\mathrm{L00}$ L.L being the place-shifted antilogarithm and —L the characteristic of the semilogarithmically coded number 0.75, and L.LL being the place-shifted antilogarithm and +L00 the characteristic of the number 28.

When the place-shifted antilogarithm corresponding to the number 0.75 is fed into the circuits 1–7, the following common leads, in accordance with the switching condition of the binary units $\bar{n}^{-1}$ to $\bar{n}^{-7}$ and $n^{-1}$ to $n^{-7}$ have negative potential due to their connection to the minus pole N: Common $n^{-1}$ and common leads $\bar{n}^{-2}$, $\bar{n}^{-3}$, $\bar{n}^{-4}$, $\bar{n}^{-5}$, $\bar{n}^{-6}$ and $\bar{n}^{-7}$.

If positive potential is applied to terminal 1 in FIG. 1, a positive potential is formed at the output terminal $M^{-7}$, since the connection 3 of the end of the resistance 2 has no return to the minus pole N, either via the rectifier 4 or via the rectifiers 5 and 6, 7, 8 and 9, 10, 11 and the positive potential, which passes via the rectifier 12 to the output terminal $M^{-7}$, has no return to the minus pole via the rectifiers 13 and 14, since the rectifier 13 acts as a barrier.

Figure 2:
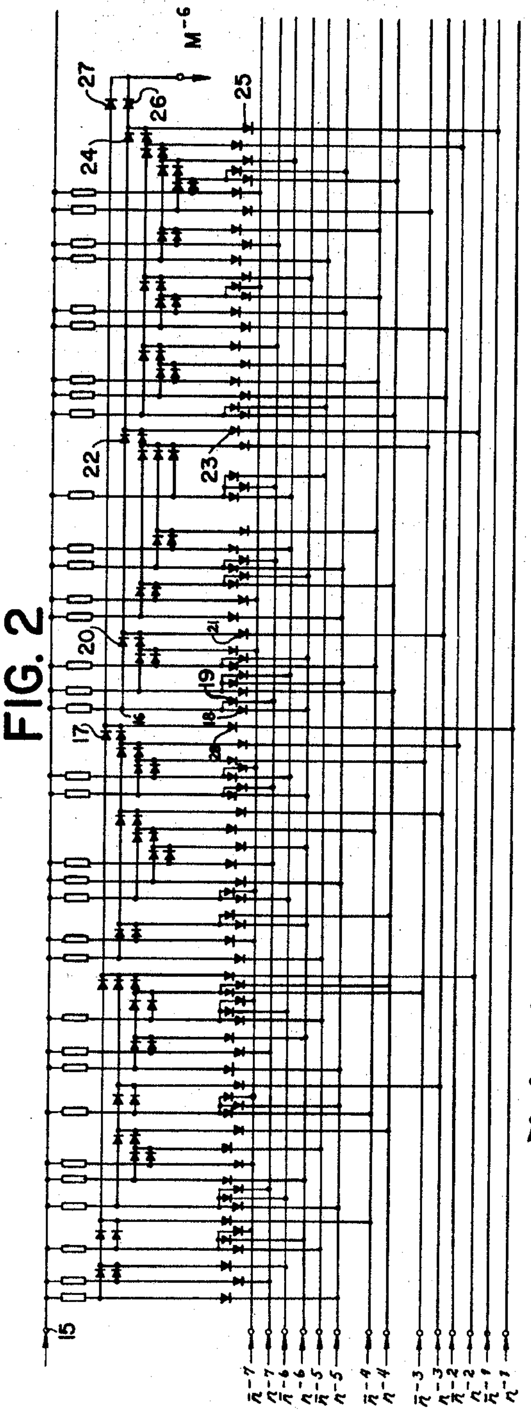
Figure 2:
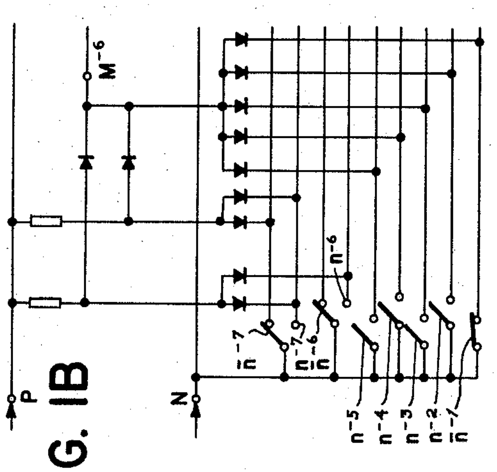
Figure 2:
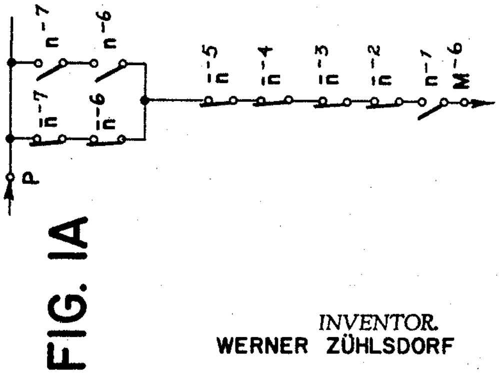

The output terminal $M^{-6}$ in FIG. 2, when positive potential is applied to the input terminal 15, likewise has positive potential, since the junction 16 of the end of the resistance 17 has no return to the minus pole N via the rectifiers 20 and 21, 22 and 23, 24 and 25, and the positive potential passing via the rectifier 26 to the output terminal $M^{-6}$ has no return to the minus pole N via the rectifier 28, due to the barrier effect of rectifier 27.

Figure 3:
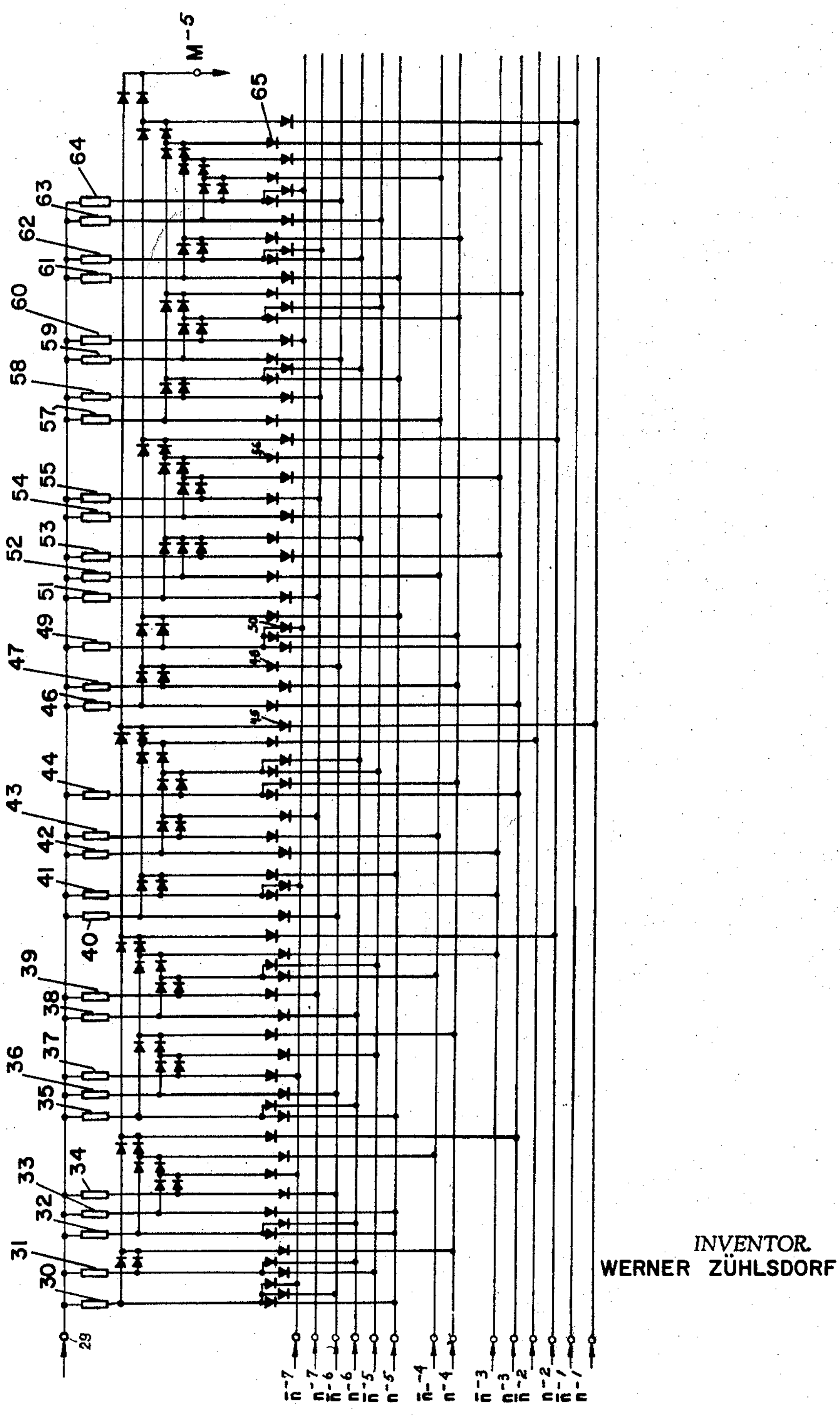

The output terminal $M^{-5}$ in FIG. 3, however, when positive voltage is applied to the input terminal 29, has no positive potential, since the resistances 30 to 44 are connected via the rectifier 45 to the common lead $n^{-1}$ carrying negative potential. The resistances 46 and 47 are connected by the rectifier 48 to the common lead $M^{-6}$ carrying negative potential. The resistance 49 is connected by the rectifier 50 to the common lead $\bar{n}^{-7}$ carrying negative potential. The resistances 51 to 55 have their return to the minus pole N via the rectifier 56 and the common lead $\bar{n}^{-5}$. The resistances 57 to 64 are connected by the rectifier 65 to the common lead $\bar{n}^{-2}$ carrying negative potential. Thus, the ends of the resistances 30 to 44, 46, 47 and 49, as well as 51 to 64, are all connected to negative potential, and due to that, no positive potential occurs at the output terminal $M^{-5}$.

Figures 4, 5:
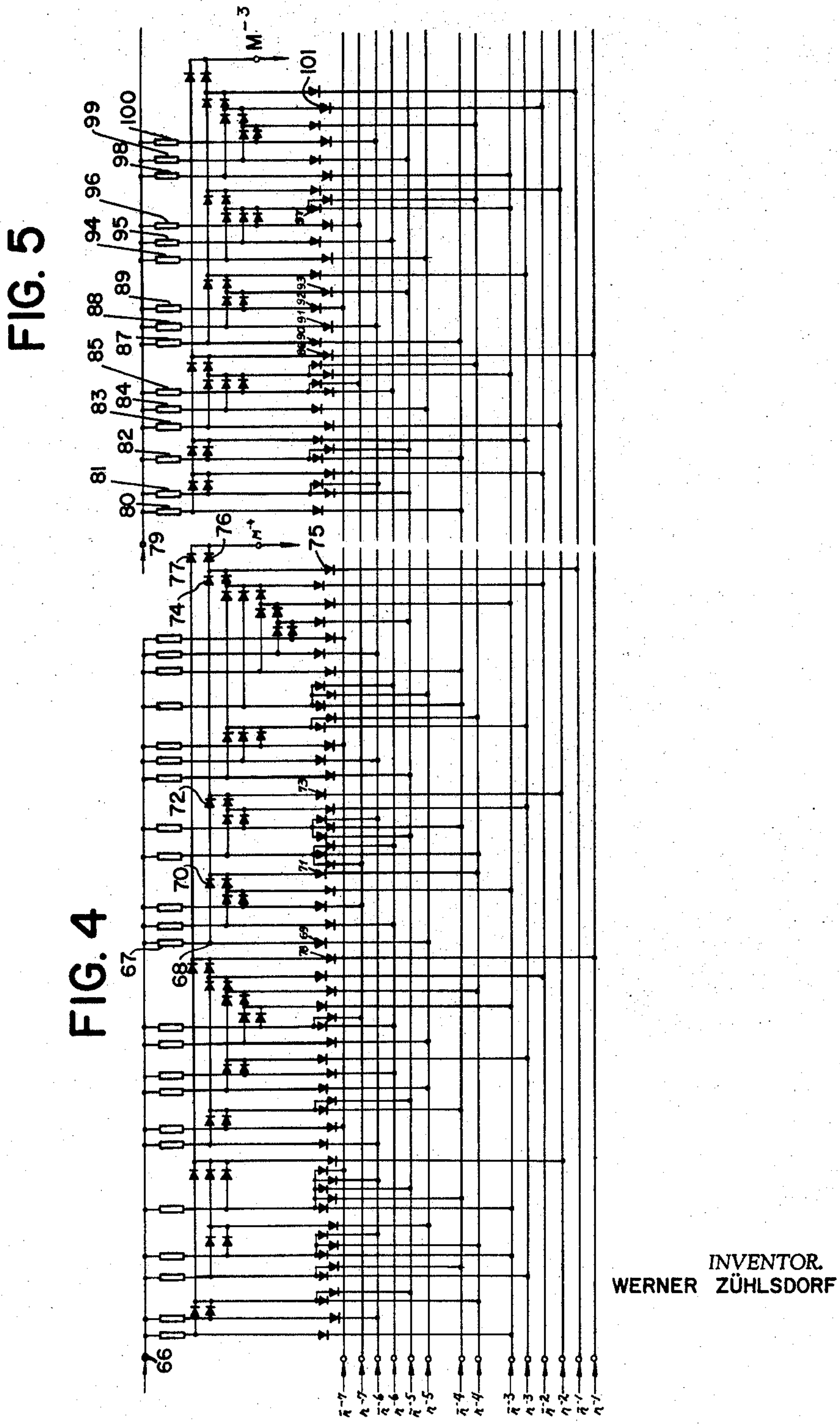

When positive potential is applied to the input terminal 66 in FIG. 4, positive potential occurs at the output terminal $M^{-4}$, since the connection 68 of the end of resistance 67 has no return to the minus pole N either via the rectifier 69 or via the rectifiers 70 and 71, 72 and 73, 74 and 75, and the positive potential arriving at the output terminal $M^{-4}$ via the rectifier 76 and due to the barrier effect of rectifier 77, has no return to the minus pole via the rectifier 78.

The output terminal $M^{-3}$ in FIG. 5, however, has no positive potential when positive voltages are applied to the input terminal 79, since the resistances 80 to 85 are connected via the rectifier 86 to the commonl lead $n^{-1}$ carrying negative potential. The resistances 87 to 89 are connected to negative potential via the rectifiers 90 to 93, the resistances 95 to 96 are connected to negative potential via the rectifier 97 and the resistances 98 to 100 are likewise applied to negative potential via the rectifier 101. Thus, the ends of the resistances 80 to 85, 87 to 89, 94 to 96, 98 to 100 are all applied to negative potential, so that there is no positive potential at the output terminal $M^{-3}$.

Figures 6, 7:
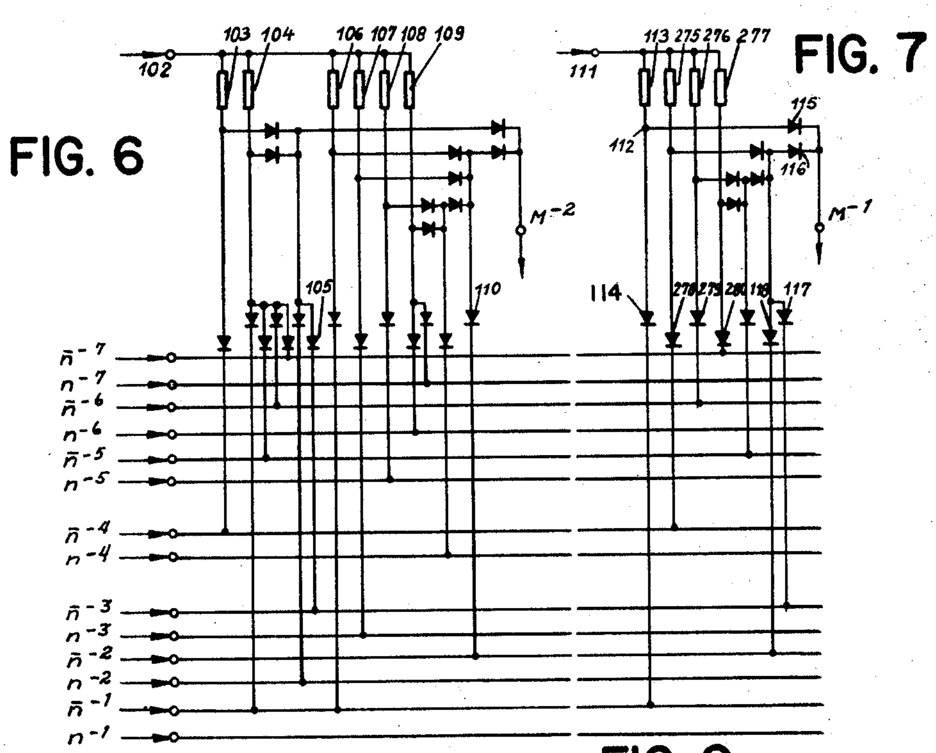

When a positive potential is applied to the input terminal 102 in FIG. 6, no positive potential occurs at the output terminal $M^{-2}$, since the resistances 103 and 104 are connected to negative potential by their ends via the rectifier 105 and the resistances 106 to 109 are likewise connected to negative potential via the rectifier 110. Thus the ends of the resistances 103, 104 and 106 to 109 are all connected to negative potential, so that no positive potential occurs at the output terminal $M^{-2}$.

When a positive potential is applied to the input terminal 111 in FIG. 7, positive potential occurs at the output terminal $M^{-1}$, since the junction 112 of the end of resistance 113 has no return to negative potential via the rectifier 114, and the positive potential passing to the output terminal $M^{-1}$ via the rectifier 115, due to the barrier effect of the rectifier 116, has no return to the minus pole N via the rectifiers 117 and 118.

The positive potential formed at the terminals $M^{-1}$, $M^{-4}$, $M^{-6}$ and $M^{-7}$ corresponds to the mantissa

0.L00L0LL of the logarithm to the base 2 of the place-shifted antilogarithm L.L corresponding to the number 0.LL=0.75.

When the place-shifted antilogarithm L.LL, corresponding to the number LLL00=28, is fed into the circuit of FIGS. 1 to 7 by closing of contacts $\overline{n}^{-7}$, $\overline{n}^{-6}$, $\overline{n}^{-5}$, $\overline{n}^{-4}$, $\overline{n}^{-3}$, and $n^{-2}$ and $n^{-1}$ for the common leads $\overline{n}^{-7}$, $\overline{n}^{-6}$, $\overline{n}^{-5}$, $\overline{n}^{-4}$, $\overline{n}^{-3}$, and $n^{-2}$ and $n^{-1}$, due to the switching position of the binary units representing this place-shifted logarithm, negative potential is produced in the common leads $\overline{n}^{-7}$, $\overline{n}^{-6}$, $\overline{n}^{-5}$, $\overline{n}^{-4}$ and $\overline{n}^{-3}$, as well as $n^{-2}$ and $n^{-1}$. With this switching condition of the binary units, the output terminal $M^{-7}$ in FIG. 1, the output terminal $M^{-6}$ in FIG. 2 and the output terminal $M^{-5}$ in FIG. 3 do not carry positive potential, but the output terminal $M^{-2}$ in FIG. 6 and the output terminal $M^{-1}$ in FIG. 7 carry positive potential again. This potential condition at the output terminals $M^{-1}$ to $M^{-7}$ corresponds to the mantissa 0.LL00LLL of the logarithm to the base 2, to which is assigned the place-shifted antilogarithm L.LL corresponding to the number LLL00=28.

Corresponding to the multiplication problem dealt with in the example, the two mantissas

0.L00L0LL+0.LL00LLL formed at the output terminals of the mantissa device or devices are now added by known binary addition circuits connected to terminal $M^{-1}$ to $M^{-7}$ to form the mantissa-sum L.0LL00L0. Likewise with known circuits, the characteristics (−L)+(+L00) associated with the binary numbers 0.LL and LLL00 are added together to form the characteristic-sum +LL. The numerical value L occurring in front of the decimal in the mantissa addition is added as carry over to the result +LL of adding the characteristics, so that the characteristic of the computing result of the multiplication +L00 occurs as end result of the characteristic-addition, and as mantissa-sum, the binary number 0.0LL00L0 is to be recorded into the place-shifted antilogarithm of the computation result.

In FIGS. 8 to 14, there is negative potential in the common leads $\overline{m}^{-7}$, $\overline{m}^{-6}$, $\overline{m}^{-5}$, $\overline{m}^{-4}$, $\overline{m}^{-3}$, $\overline{m}^{-2}$ and $\overline{m}^{-1}$, caused by the switching condition of the binary units representing the mantissa sum 0.0LL00L0 of the logarithm to the base 2, due to their connection to the minus pole N.

Figures 8, 9:
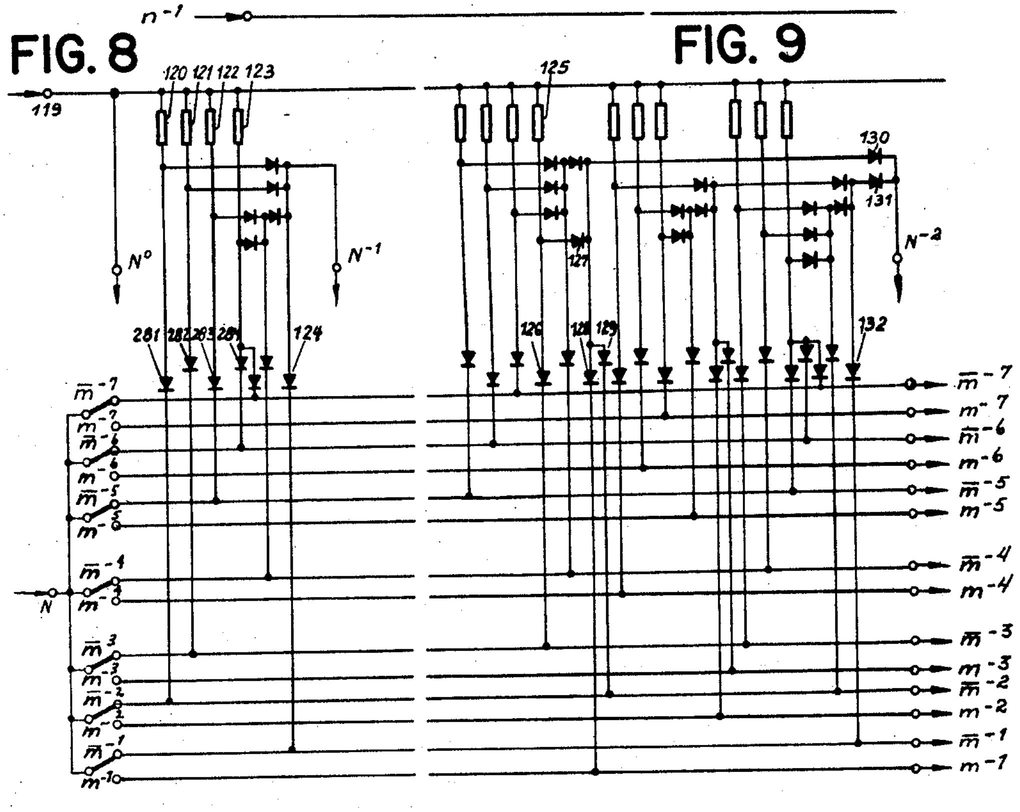
FIGS. 8–14 show constructed circuits for converting the mantissa sum or difference into the corresponding place-shifted antilogarithm of the binary computation result.

When positive potential is applied to the input terminal 119 in FIG. 8, positive potential occurs at the output terminal $N^0$. At the output terminal $N^{-1}$, however, no positive potential occurs, since the resistances 120 to 123 are connected via the rectifier 124 to the common lead $\overline{m}^{-1}$ carrying negative potential.

Positive potential passes to the output terminal $N^{-2}$ of FIG. 9 via the resistance 125, since no connection is established to a common lead carrying negative potential either via the rectifier 126 or via the rectifiers 127 to 129, and the positive potential arriving at the output terminal $N^{-2}$ via the rectifier 130, due to the barrier effect of the rectifier 131 has no return to the common lead connected via rectifier 132 and carrying negative potential.

Figure 10:
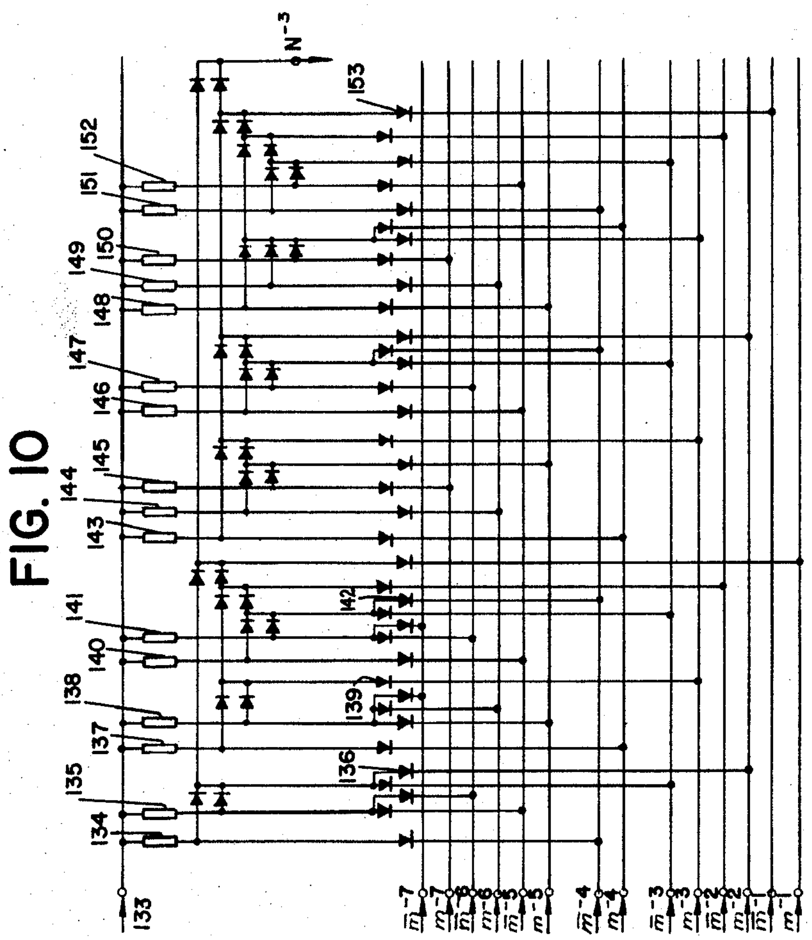
Figure 11:
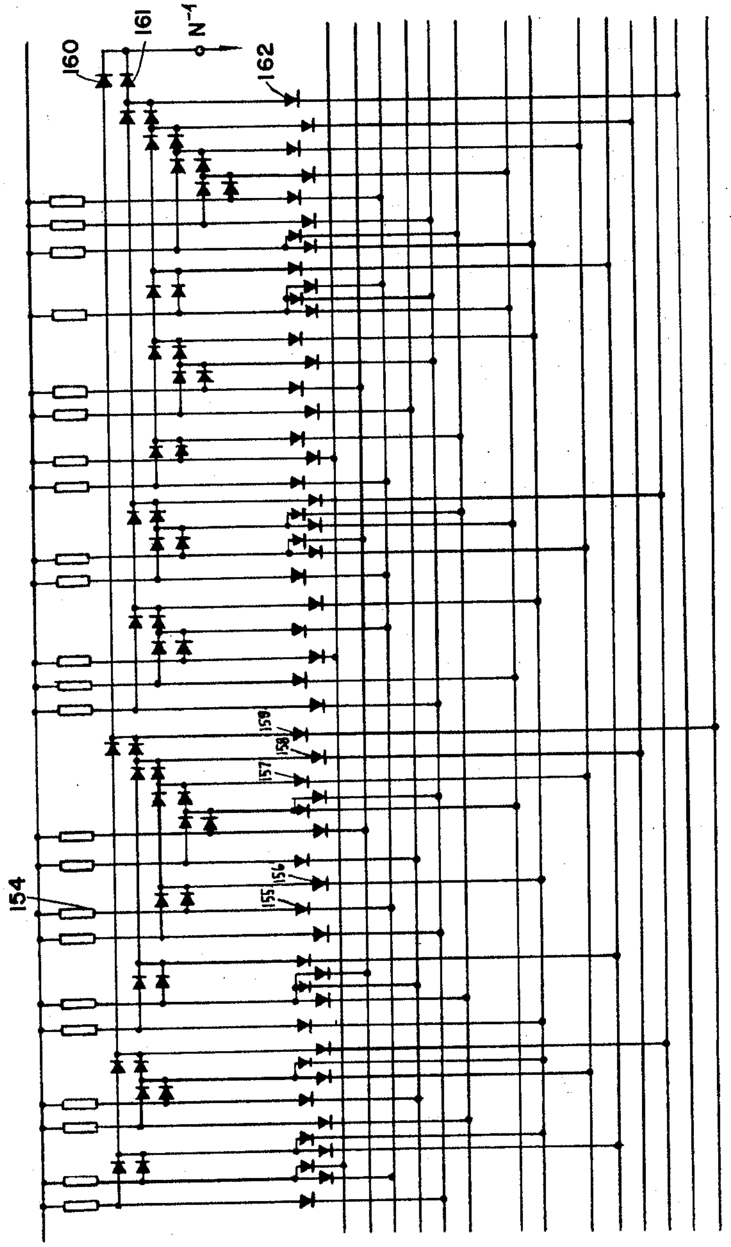
Figure 12:
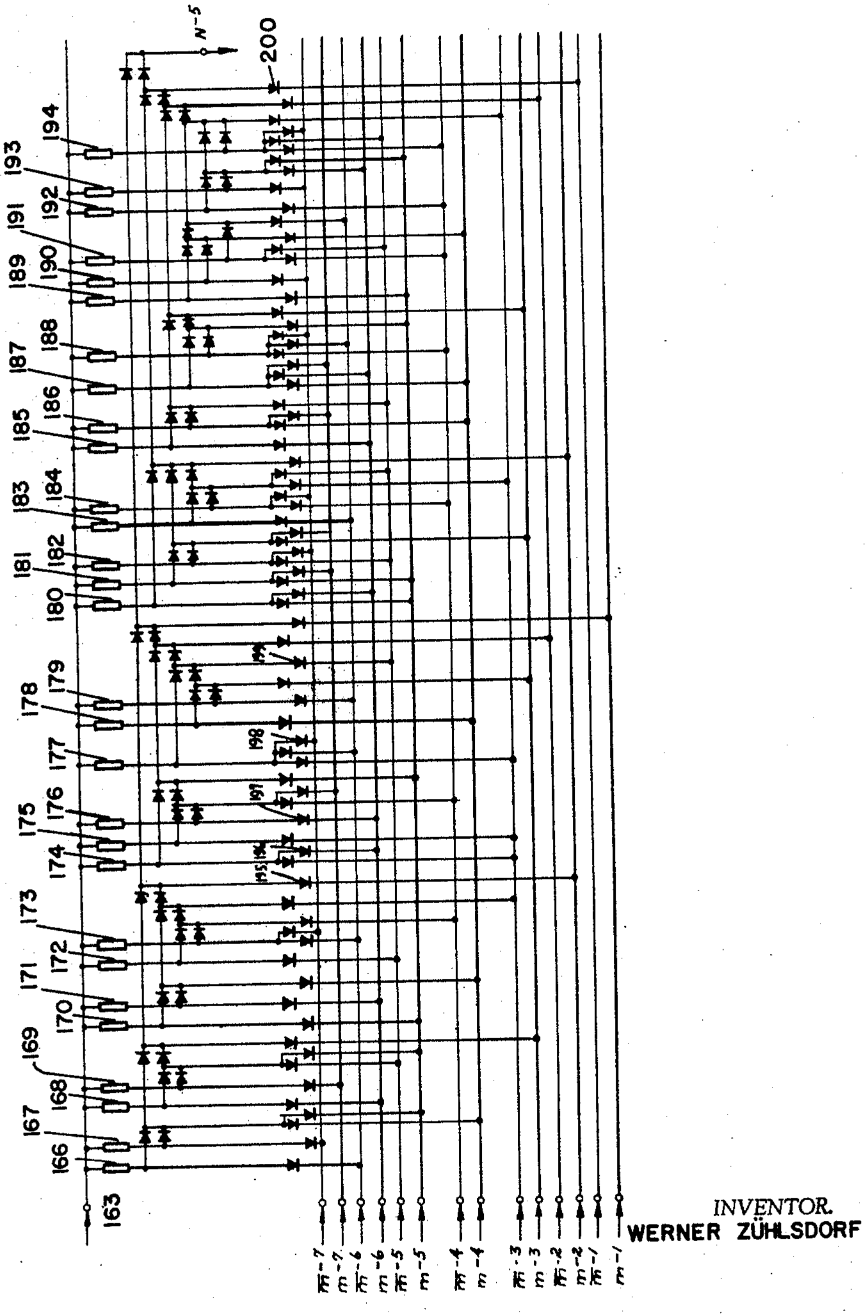
Figure 13:
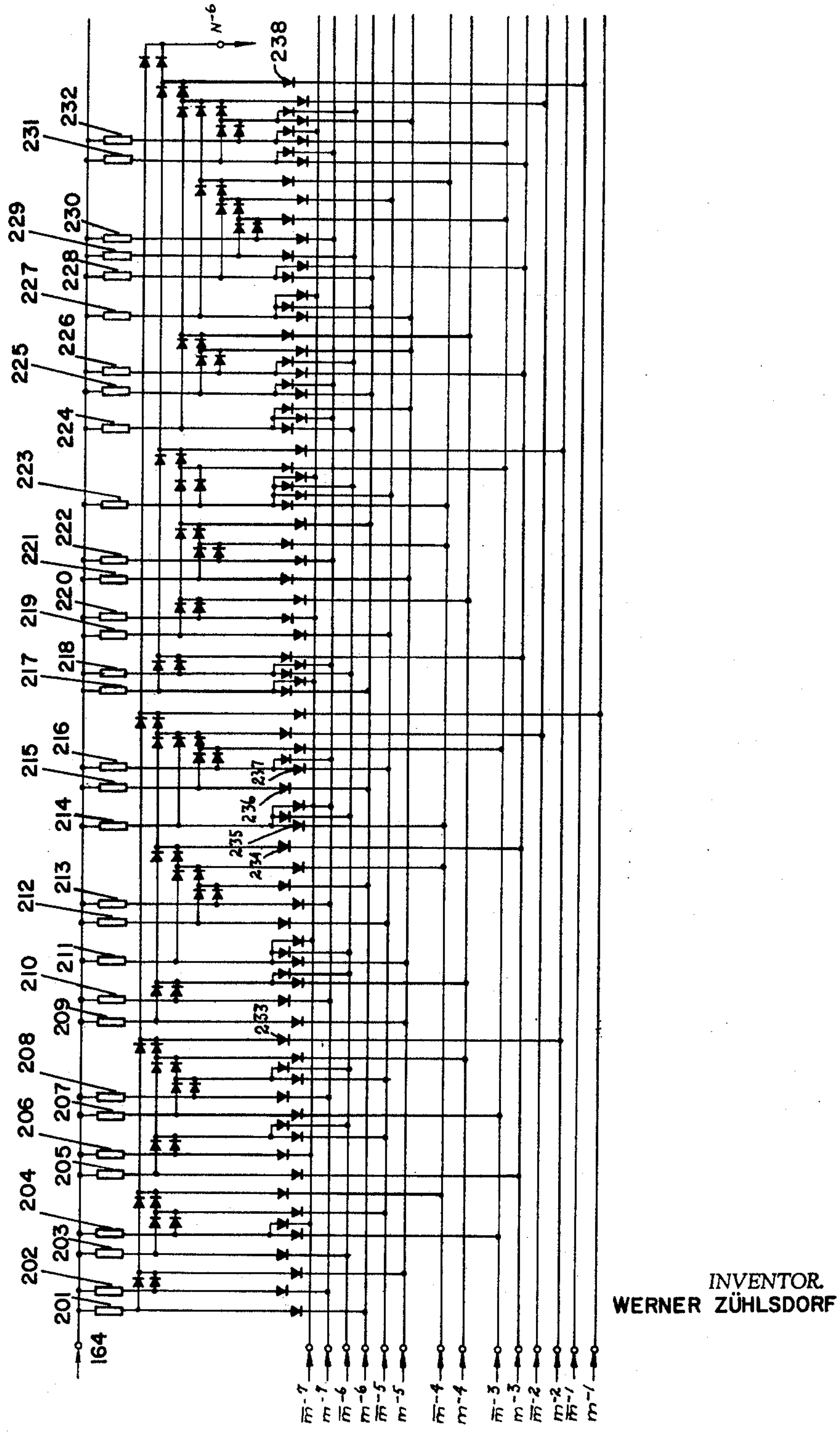
Figure 14:
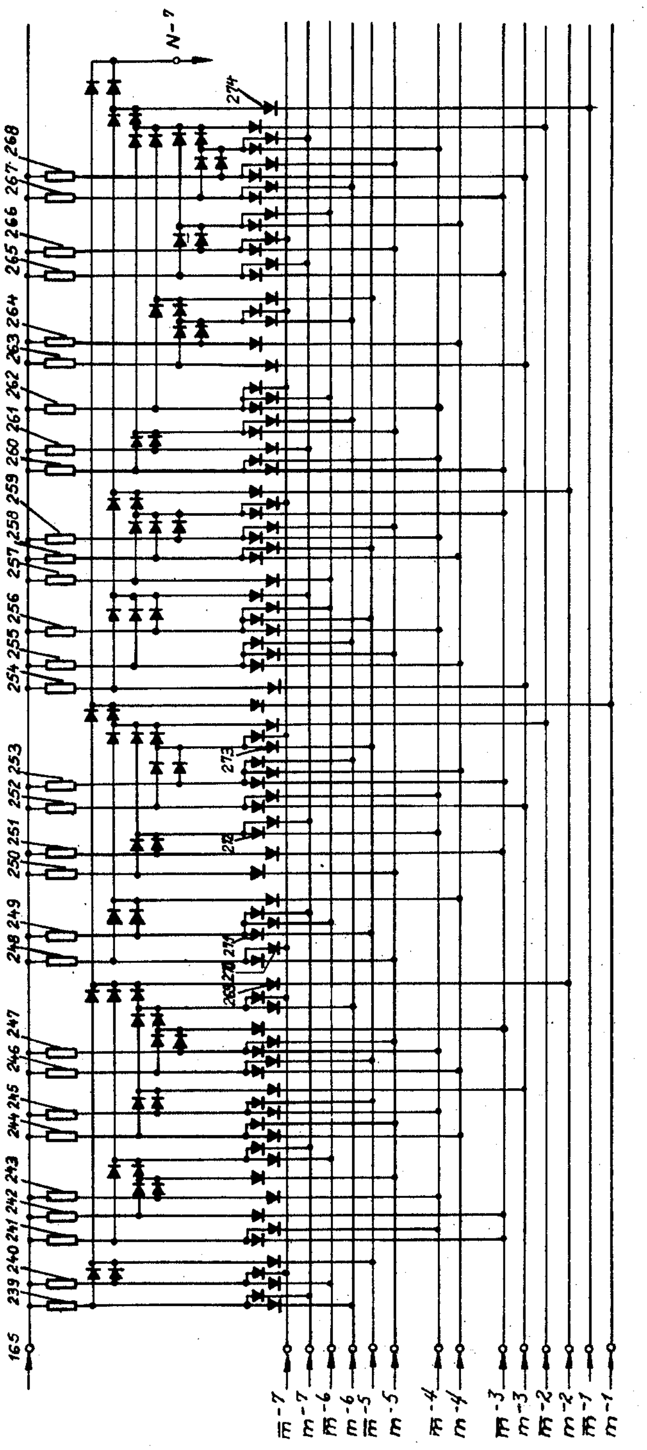

When positive potential is applied to the input terminal 133 in FIG. 10, no negative potential occurs at the output terminal $N^{-3}$, since the resistances 134 and 135 are connected via the rectifier 136, the resistances 137 and 138 via the rectifier 139, the resistances 140 and 141 via the rectifier 142 and the resistances 143 to 152 via the rectifier 153 to a common lead carrying negative potential. In FIG. 11, positive potential arrives at the output terminal $N^{-4}$ via the resistance 154, since neither the rectifier 155 nor 156, 157, 158 and 159 are connected to common mains carrying negative potential, so that via the rectifier 160 positive potential arrives at the output terminal $N^{-4}$ and via the rectifiers 161 and 162 has no return to negative potential, since the rectifier 161 acts as a barrier. When positive potential is applied to the terminals 163 in FIG. 12, 164 in FIG. 13 and 165 in FIG. 14, no positive potential arrives at the output terminals $N^{-5}$, $N^{-6}$ and $N^{-7}$, since in FIG. 12 the resistances 166 to 194 via the rectifiers 195 to 200. In FIG. 13 the resistances 201 to 232 via the rectifiers 233 to 238 and in FIG. 14 the resistances 239 to 268 via the rectifiers 269 to 274 are connected to common leads carrying negative potential.

The potential condition at the terminals $N^0$ and $N^{-1}$ to $N^{-7}$ corresponds to the place-shifted antilogarithm L.0L0L000 of the computation result. The complete computation result of the multiplication dealt with, as an example, has thus been determined logarithmically, taking into consideration the computation result of the characteristic 0.75×28=L.0L0L000+L00=L0L0L=21

In carrying out division problems, the control of the mantissa devices occurs as described in the foregoing, but in accordance with logarithmic computation laws, the difference of the mantissas and characteristics of the two factors is formed. The control of the mantissa devices in binary number computing machines, in the machine computation of powers having any exponents, is effected as follows:

The base of the power fed into the computing machine as semilogarithmically coded binary number is coded to the logarithm to the base 2 by the circuits according to FIGS. 1 to 7. The resulting logarithm, consisting of the characteristic in front of the decimal point and the mantissa, which is represented at the output terminals of FIGS. 1 to 7, is reconverted according to known circuits into a semi-logarithmically coded number. By re-feeding the place-shifted antilogarithm into a mantissa device according to the circuits of FIGS. 1 to 7, the said number is once more converted into a logarithm to the base 2.

The exponent of the power, likewise in semilogarithmically coded form, is likewise coded to a logarithm to the base 2 by conversion of a place-shifted antilogarithm by means of a mantissa device according to FIGS. 1 to 7.

The doubly coded mantissa and characteristic of the base and the mantissa and characteristic of the exponent are added.

By feeding the mantissa sum into a circuit according to FIGS. 8 to 14, it is reconverted into the place-shifted antilogarithm. This place-shifted antilogarithm, according to a known circuit, is converted by shifting of the decimal point in accordance with the place number expressed by the characteristic sum into an absolute binary number corresponding to the logarithm of the required power. The mantissa appearing after the decimal point of the logarithm of the required power is reconverted into the place-shifted antilogarithm of the required power by feeding it once more into a circuit according to FIGS. 8 to 14.

This place-shifted antilogarithm, in combination with the characteristic appearing in front of the decimal point of the logarithm of the power computation result, represents the required power in semi-logarithmically coded form.

The control of the mantissa devices in binary computing machines, in the machine computation of roots of any exponents, is effected in the same way as in the hereinbefore described computation of powers, with the sole difference that the characteristic and mantissa of the root exponent are subtracted from the characteristic and mantissa of the doubly logarithmically coded radicand.

The control of the mantissa devices according to the invention in binary computing machines, in the machine computation of logarithms to any desired base, is effected as follows:

The binary number of the base of the logarithm to be determined and the antilogarithm of the required logarithm are both doubly logarithmically coded. After subtraction of the mantissas and characteristics of the doubly logarithmically coded base from the doubly logarithmically coded antilogarithm determines the logarithm to base 2 of the desired logarithm to any base.

After feeding the mantissa of this logarithm to base 2 into a circuit according to FIGS. 8 to 14, the place-shifted antilogarithm is formed, which in combination with the characteristic-difference formed by the characteristic-subtraction, represents in semi-logarithmically coded form the computation result of the logarithm to any base which was to be determined.

With the employment of 2 mantissa devices according to the circuit of FIGS. 1 to 7 and one mantissa device according to the circuit of FIGS. 8 to 14, as well as the application of the known parallel-addition in the formation of the mantissa—and characteristic—sum or differences, any desired multiplication or division problem can be carried out with the control of the mantissa devices according to the foregoing description in 3 switching steps if, in the binary number computing machine, the two fed-in computation values and the computation result are dealt with in semi-logarithmically coded form.

With the employment of 2 mantissa devices according to the circuit FIGS. 1 to 7 and one mantissa device according to the circuits of FIGS. 8 to 14 as well as the application of parallel-addition in the formation of the mantissa—and characteristic—sum or difference, and a known computing device, which converts absolute binary numbers in one switching step into semi-logartihmically coded binary numbers, any desired power-raising or root-finding problem can be performed in 6 switching steps with the control of the mantissa according to the foregoing description, if in the binary number computing machine, the two fed-in computation values and the computation result are dealt with in semi-logarithmically coded form.

The following is an example of the use of the circuits for raising a number to a given power:

$$x=3^{2.5} \quad =LL^{L0.L}$$

$$\log x=2.5 \log 3 \quad =L0.L\times\log LL$$

$$\log(\log x) \quad =\log L0.L+\log(\log LL)$$

The base of power (L.L+L) fed into the computer as semilogarithmically coded binary number is coded into the logarithm to base 2 (mantissa 0.L00L0LL) by the circuits according to FIGS. 1–7, the so obtained logarithm consisting of characteristic (+L) which stands in front of the period, and mantissa (0.L00L0LL) which is represented at the output terminals of the mantissa unit and indicates the binary digits after the period, yields logarithm L.L=+L.L00L0LL which according to known circuits (see bibliography) is again converted into a semilogarithmically coded number (L.L00L0LL+0). For instance, a shaft register (p. 299 of "High-Speed Computing Devices") may be used in which an indication is maintained of the extent and direction in which the stored number is shifted. This number is again converted into a logarithm to base 2 (0.L0L0L0L) by once more feeding the shifted antilogarithm into a mantissa unit according to circuits in FIGS. 1–7.

The exponent of the power (L0.L) is, likewise in semilogarithmically coded form (L.0L+L), also coded into a logarithm of base 2 (0.0L0L00L+L) by conversion of its shifted antilogarithm (L.0L) by means of a mantissa unit according to FIGS. 1–7.

The doubly coded mantissa and characteristic of the base (0.L0L0L0L+0) and the mantissa and characteristic of the exponent (0.0L0L00L+L) are added $$\begin{array}{rr} 0.L0L0L0L & +0 \\ +\ 0.0L0L00L & +L \\ \hline 0.LLLLLL0 & +L \end{array}$$

The sum of mantissas (0.LLLLLL0) is reconverted into the place-shifted antilogarithm (L.LLLLLL0) by feeding into a circuit according to FIGS. 8–14.

By the known circuit (see bibliography), the shifted antilogarithm is converted by period shifting in accordance with the digit position indicated by the characteristic (+L) into an absolute binary number (LL.LLLLL), which corresponds to the logarithm of the power sought.

The mantissa (0.LLLLL) after the period of the logarithm of the power sought, is reconverted into the shifted antilogarithm of the power (L.LLLL0L) by once more feeding it into the circuit according to FIGS. 8–14.

This shifted antilogarithm represents, together with the characteristic (+LL) in front of the period of the logarithm of the power-raising result, the sought power in semilogarithmically coded form $$(L.LLLL0L+LL)=15.625$$

This as compared to the exact result of computation for $x=3^{2.5}=15.59$ involves an error of computation of about 2.2‰.

With the use of relays as binary units in the computing devices and mantissa devices, computers controlled in the manner hereinbefore described can operate more rapidly than many known electronic computers, since in the control of the known binary number computing machines, particularly in the solution of higher computing problems, such as for example in divisions and root calculations, due to the multiplicity of the individual and partial operations, a number of steps going into thousands is required before the computed result is determined.

The computed results calculated by means of the binary number computing machines with the mantissa devices according to the invention, in the case of the use of mantissa devices with 7 binary places after the decimal point according to FIGS. 1 to 14, show a mean error of 0.1 percent of the computed result. If the computation values are represented with more than 7 binary places after the decimal point, the computing accuracy can be increased to any desired extent, provided a correspondingly higher expenditure on apparatus is accepted.

I have shown preferred embodiments of my invention, but it is understood that this disclosure is for the purpose of illustration, and that various changes in shape and proportion, as well as the substitution of equivalent elements for those herein shown and described may be made without departing from the spirit and scope of the invention as set forth in the appended claim.

*Bibliography*

Tombkins, C. B., Wakelin, J. H., Stifler, W. W.: High-Speed Computing Devices, McGraw-Hill Book Company, Inc., New York.

Berkeley, E. C., Wainwright, L.: Computers, Reinhold Publishing Corporation, New York.

Rutishauser, H., Speiser, A., Stiefel, E.: Programmgesteuerte digitale Rechengeräte, Birkhäuser Verlag, Basel.

What I claim is:

For use in an electrical binary computing machine, a mantissa calculating device for calculating the mantissa of a number wherein the decimal point of said number is shifted so that the characteristic of the logarithm of said shifted binary number to the base 2 is equal to a predetermined value, comprising:

M output terminals wherein M is equal to the number of digit positions in the mantissa to be calculated, first terminal means at a fixed potential, second terminal means at a fixed potential, M logical circuits consisting of a plurality of resistors and uni-directional conductive elements, each of said logical circuits being connected to said first terminal means, and each including a plurality of control terminals and one of said output terminals, and switch means connected between said second terminal means and each of said logical circuits to selectively apply said second potential to said control terminals according to the binary value of said shifted number, the unidirectional conductive elements in each of said logical circuit being connected to gate the potential at said first terminal means to the output of that logical circuit depending upon the binary representation coupled to said control terminals, whereby the voltages appearing on said M output terminals provide a binary representation of the mantissa of the logarithm to the base of 2 of said shifted binary number.

References Cited in the file of this patent

UNITED STATES PATENTS 2,940,669 Hobbs ---------------- June 14, 1960